(12) United States Patent
Raza et al.

(10) Patent No.: US 11,892,987 B2
(45) Date of Patent: Feb. 6, 2024

(54) AUTOMATIC SPLITTING OF A COLUMN INTO MULTIPLE COLUMNS

(71) Applicant: Microsoft Technology Licensing, LLC, Redmond, WA (US)

(72) Inventors: Mohammad Raza, North Vancouver (CA); Sumit Gulwani, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 809 days.

(21) Appl. No.: 15/299,071

(22) Filed: Oct. 20, 2016

(65) Prior Publication Data

US 2018/0113890 A1    Apr. 26, 2018

(51) Int. Cl.
G06F 16/21    (2019.01)
G06N 5/025    (2023.01)

(52) U.S. Cl.
CPC ........... *G06F 16/213* (2019.01); *G06N 5/025* (2013.01)

(58) Field of Classification Search
CPC ............................. G06F 16/213; G06N 5/025
See application file for complete search history.

(56) References Cited

U.S. PATENT DOCUMENTS

| | | |
|---|---|---|
| 6,968,395 B1 | 11/2005 | Lee |
| 7,945,525 B2 | 5/2011 | Ananthanarayanan et al. |
| 8,271,297 B2 | 9/2012 | Crooks et al. |
| 8,356,060 B2 * | 1/2013 | Marwah ................ G06F 16/284 707/812 |
| 8,701,032 B1 | 4/2014 | Zhai et al. |
| 8,793,653 B2 | 7/2014 | Balasubramanian et al. |
| 8,924,340 B2 | 12/2014 | Cui et al. |
| 8,972,930 B2 | 3/2015 | Gulwani |
| 9,002,758 B2 | 4/2015 | Gulwani et al. |

(Continued)

OTHER PUBLICATIONS

"Split text into different columns with the Convert Text to Columns Wizard", Available at: <<https://support.office.com/en-us/article/Split-text-into-different-columns-with-the-Convert-Text-to-Columns-Wizard-30B14928-5550-41F5-97CA-7A3E9C363ED7?ui=en-US&rs=en-US&ad=US>>, Retrieval Date: Sep. 16, 2016, 4 Pages.

(Continued)

*Primary Examiner* — Kris E Mackes
*Assistant Examiner* — Lin Lin M Htay
(74) *Attorney, Agent, or Firm* — Calfee, Halter & Griswold LLP

(57) ABSTRACT

Various technologies described herein pertain to automated data splitting using predictive program synthesis. Input-only examples for splitting an input column of an input data set can be received. The input-only examples can include example entries from the input column of the input data set to be split into multiple output columns without specification of how the example entries are to be split into multiple output columns. Further, a program for splitting the input column of the input data set into the multiple output columns can be synthesized based on the input-only examples. The program can be synthesized, given the input-only examples, in a domain-specific language (DSL) for splitting an entry into a tuple of fields utilizing a predictive program synthesis algorithm. Moreover, the program can be executed on the input data set to split the input column of the input data set into the multiple output columns.

20 Claims, 11 Drawing Sheets

(56) References Cited

U.S. PATENT DOCUMENTS

| | | |
|---|---|---|
| 9,959,265 B1 | 5/2018 | Vagell et al. |
| 2002/0178171 A1* | 11/2002 | Walker .................. G06F 16/284 |
| 2003/0167277 A1* | 9/2003 | Hejlsberg .................. G06F 9/46 |
| 2004/0267732 A1* | 12/2004 | Luk ..................... H04L 45/7457 |
| 2006/0004854 A1 | 1/2006 | Okunseinde et al. |
| 2007/0078872 A1* | 4/2007 | Cohen .................. G06F 16/338 |
| 2009/0089278 A1 | 4/2009 | Poola et al. |
| 2009/0138503 A1 | 5/2009 | Chowdhury |
| 2009/0327115 A1* | 12/2009 | Schilder ................. G06Q 40/00 705/35 |
| 2010/0057733 A1 | 3/2010 | Purisai et al. |
| 2011/0087839 A1* | 4/2011 | Sharma .................. G06F 16/29 711/118 |
| 2012/0192051 A1 | 7/2012 | Rothschiller et al. |
| 2012/0254252 A1* | 10/2012 | Jin ........................ G06F 16/283 707/797 |
| 2013/0226944 A1 | 8/2013 | Baid et al. |
| 2013/0326475 A1 | 12/2013 | Gulwani et al. |
| 2013/0346982 A1 | 12/2013 | Kalai et al. |
| 2014/0108418 A1 | 4/2014 | Elbaum et al. |
| 2014/0280188 A1* | 9/2014 | Seiwald .............. G06F 16/2228 707/741 |
| 2014/0324839 A1 | 10/2014 | Sayers et al. |
| 2014/0372857 A1* | 12/2014 | Otero ..................... G06F 9/453 715/220 |
| 2015/0254530 A1 | 9/2015 | Gulwani et al. |
| 2015/0324346 A1 | 11/2015 | Sankaran et al. |
| 2015/0378978 A1 | 12/2015 | Gross et al. |
| 2016/0154845 A1 | 6/2016 | Jain et al. |

OTHER PUBLICATIONS

Jambor, Sebastian, "Intelligence to Automate Common Data Structuring", TRIFACTA, Retrieved at: <<https://www.trifacta.com/blog/intelligence-to-automate-common-data-structuring/>>, Jan. 13, 2016, 6 pages.

Gulwani, Sumit, "Automating String Processing in Spreadsheets Using Input-Output Examples", In PoPL, Jan. 26, 2011, 13 pages.

Le, et al., "FlashExtract: A Framework for Data Extraction by Examples", In PLDI, Jun. 9, 2014, 12 pages.

Kandel, et al., "Wrangler: Interactive Visual Specification of Data Transformation Scripts", In Proceedings of the SIGCHI Conference on Human Factors in Computing Systems, May 7, 2011, 10 pages.

Lau, et al., "Programming by Demonstration Using Version Space Algebra", 2001, 60 pages.

"Final Office Action Issued in U.S. Appl. No. 15/333,119", dated Oct. 4, 2019, 25 Pages.

"Non Final Office Action Issued in U.S. Appl. No. 15/333,119", dated Jun. 6, 2019, 21 Pages.

"Non Final Office Action Issued in U.S. Appl. No. 15/333,119", dated Jan. 7, 2020, 28 Pages.

"Final Office Action Issued in U.S. Appl. No. 15/333,119", dated May 11, 2021, 32 Pages.

* cited by examiner

| |
|---|
| 191.128.19.55 - - [09/Jun/2016:18:05:33 -0800] "GET /checks.txt HTTP/1.1" 220 617 www.aaa.com/ |
| 174.13.04.3 - - [09/Jun/2016:19:43:23 -0800] "GET /images/pic.png HTTP/1.1" 403 18 - |
| 192.16.201.1 - - [10/Jun/2016:06:10:03 -0800] "GET /pdf/doc.pdf HTTP/1.1" 204 23 http://www.bbb.com/ |
| 11.0.4.50 - - [10/Jun/2016:16:10:02 -0800] "GET /index.html HTTP/1.1" 234 74 http://ccc.com |
| 191.169.12.13 - - [11/Jun/2016:11:10:02 -0800] "GET /index.html HTTP/1.1" 505 75 www.ddd.com/ |
| 172.18.0.102 - - [11/Jun/2016:16:12:34 -0800] "GET /logs/access.log HTTP/1.1" 234 32 https://gg.com/ |
| 192.19.2.100 - - [11/Jun/2016:17:32:36 -0800] "GET /index.html HTTP/1.1" 500 15 - |
| 10.129.2.78 - - [11/Jun/2016:17:45:38 -0800] "GET /data/2/4 HTTP/1.1" 130 933 - |
| 171.19.3.12 - - [11/Jun/2016:22:12:01 -0800] "GET /data/ HTTP/1.1" 254 5 https://x.com/us |
| 191.168.125.11 - - [11/Jun/2016:23:12:52 -0800] "GET /pics/pic2.png HTTP/1.1" 304 502 http://u.net |

204:

| 206 | 208 | 210 | 212 | 214 | 216 | 218 | 220 | 222 | 224 | 226 | 228 | 230 | 232 | 234 | 236 | 238 | 240 | 242 | 244 | 246 |
|---|---|---|---|---|---|---|---|---|---|---|---|---|---|---|---|---|---|---|---|---|
| 191.128.19.55 | - - [ | 09/Jun/2016 | : | 18:05:33 | - | 0800] | "GET | / | checks.txt | | HTTP | / | 1.1 | " | 220 | | 617 | | | www.aaa.com/ |
| 174.13.04.3 | - - [ | 09/Jun/2016 | : | 19:43:23 | - | 0800] | "GET | / | images/pic.png | | HTTP | / | 1.1 | " | 403 | | 18 | | | - |
| 192.16.201.1 | - - [ | 10/Jun/2016 | : | 06:10:03 | - | 0800] | "GET | / | pdf/doc.pdf | | HTTP | / | 1.1 | " | 204 | | 23 | | | http://bbb.com |
| 11.0.4.50 | - - [ | 10/Jun/2016 | : | 16:10:02 | - | 0800] | "GET | / | index.html | | HTTP | / | 1.1 | " | 234 | | 74 | | | http://ccc.com |
| 191.169.12.13 | - - [ | 11/Jun/2016 | : | 11:10:02 | - | 0800] | "GET | / | index.html | | HTTP | / | 1.1 | " | 505 | | 75 | | | www.ddd.com/ |
| 172.18.0.102 | - - [ | 11/Jun/2016 | : | 16:12:34 | - | 0800] | "GET | / | logs/access.log | | HTTP | / | 1.1 | " | 234 | | 32 | | | https://gg.com/ |
| 192.19.2.100 | - - [ | 11/Jun/2016 | : | 17:32:36 | - | 0800] | "GET | / | index.html | | HTTP | / | 1.1 | " | 500 | | 15 | | | - |
| 10.129.2.78 | - - [ | 11/Jun/2016 | : | 17:45:38 | - | 0800] | "GET | / | data/2/4 | | HTTP | / | 1.1 | " | 130 | | 933 | | | - |
| 171.19.3.12 | - - [ | 11/Jun/2016 | : | 22:12:01 | - | 0800] | "GET | / | data/ | | HTTP | / | 1.1 | " | 254 | | 5 | | | https://x.com/us |
| 191.168.125.11 | - - [ | 11/Jun/2016 | : | 23:12:52 | - | 0800] | "GET | / | pics/pic2.png | | HTTP | / | 1.1 | " | 304 | | 502 | | | http://u.net |

AUTOMATIC SPLITTING OF A COLUMN INTO MULTIPLE COLUMNS

BACKGROUND

The information technology revolution over the past few decades has resulted in various advances. Examples of such advances include digitization of massive amounts of data and widespread access to computing devices. Moreover, it has become increasingly desirable to obtain insights from the continuously expanding volume of data. Yet, since data may be generated by differing data sources, data from the differing sources can be in a multitude of different formats.

A common challenge is dealing with the data in the different formats. Accordingly, it may be desired to bring the raw data into a form that is amenable to various analysis tools. The process of converting or mapping the raw data to another format that allows for more convenient consumption can be referred to as data cleaning or data wrangling. For instance, as part of data cleaning or data wrangling, the data can be normalized, validated, enriched, and published in an appropriate format for a particular application (e.g., for data visualization, data aggregation, training a statistical model, or otherwise obtaining insights from the data). However, pre-processing data as part of data cleaning or data wrangling can be a time-consuming activity and typically relies on programming skills of an individual in order to write robust extraction or transformation scripts.

For example, a data set to be pre-processed can include a list of entries that have been serialized. Following this example, various fields in each entry can be merged together into a single string, with delimiters between the fields in each of the entries. In order to operate over the data for further processing, the entries may need to be split into constituent fields as part of data cleaning or data wrangling. However, the delimiters used and the number of delimiters can differ. Moreover, a character may be used as a delimiting character in some places in the entries of the data set, while such character is not used as a delimiting character in other places in the entries of the data set. Accordingly, traditional tools that can split a file into columns (e.g., file parsers for comma-separated values (CSV) files) that rely on use of standardized format encodings can be unable to handle splitting the entries of a data set having arbitrary and/or varying formats.

Moreover, with the ever-increasing growth in the amount of data, there have been various attempts to use automatic programming techniques to address the problem of data cleaning or data wrangling. Many of these conventional techniques utilize programming-by-example (PBE) approaches. In PBE, a user can specify an intended task by giving input-output examples, from which a PBE system attempts to automatically generate a program in a domain-specific language (DSL) that satisfies the given examples. However, PBE approaches depend on an explicit intent specification from the user about the task that they want to perform, which often relies on the user correctly understanding the examples used by the system to infer the correct program. Further, supplying such input-output examples can involve significant manual effort from the user for various types of tasks.

SUMMARY

Described herein are various technologies that pertain to automated data splitting using predictive program synthesis. Input-only examples for splitting an input column of an input data set can be received. The input-only examples can include example entries from the input column of the input data set to be split into multiple output columns without specification of how the example entries are to be split into multiple output columns. Further, a program for splitting the input column of the input data set into the multiple output columns can be synthesized based on the input-only examples. The program can be synthesized, given the input-only examples, in a domain-specific language (DSL) for splitting an entry into a tuple of fields utilizing a predictive program synthesis algorithm. Moreover, the program can be executed on the input data set to split the input column of the input data set into the multiple output columns.

The program for splitting the input column of the input data set into the multiple output columns can be synthesized without explicit examples specifying how the input data set is to be split. The program can be generated in a predictive manner based on properties of the input data alone (as opposed to the program being generated from input-output examples that explicitly specify how one or more entries in a data set are desirably split). Thus, the input-only examples can be analyzed to identify an underlying pattern (e.g., the pattern can identify portions of the example entries that are similar and portions of the example entries that are variable). Further, the program can be synthesized to transform entries in the input data set into a tuple of fields based on the identified pattern. The program can be executed on the input data set to automatically split the input column into multiple output columns.

According to various embodiments, the program can be synthesized in the DSL for splitting an entry (e.g., a text string) into a tuple of fields based on a combination of delimiters. The delimiters can include a contextual delimiter, which is an occurrence of a constant string between a first regular expression match and a second regular expression match in the text string. Moreover, the delimiters can include a zero length delimiter, where the zero length delimiter is an empty string that specifies a boundary between two adjacent fields in the text string. The delimiters can also include a constant string delimiter, which is an occurrence of a constant string in the text string (with or without surrounding whitespace).

Pursuant to various embodiments, the program can be synthesized by synthesizing field-level programs on the input-only examples, and ranking the field-level programs. The field-level programs can be synthesized by performing a bottom-up enumerative search in the DSL; such search can employ at least one operator-specific rule application function and a generic rule application function. Moreover, the field-level programs can be ranked to select a subset of the field-level programs. The subset of the field-level programs can be a maximal collection of aligned field-level programs. Further, the program for splitting the input column of the input data set into the multiple output columns can be generated based on the subset of the field-level programs.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 illustrates an exemplary text splitting scenario.

DETAILED DESCRIPTION

Figure 1:
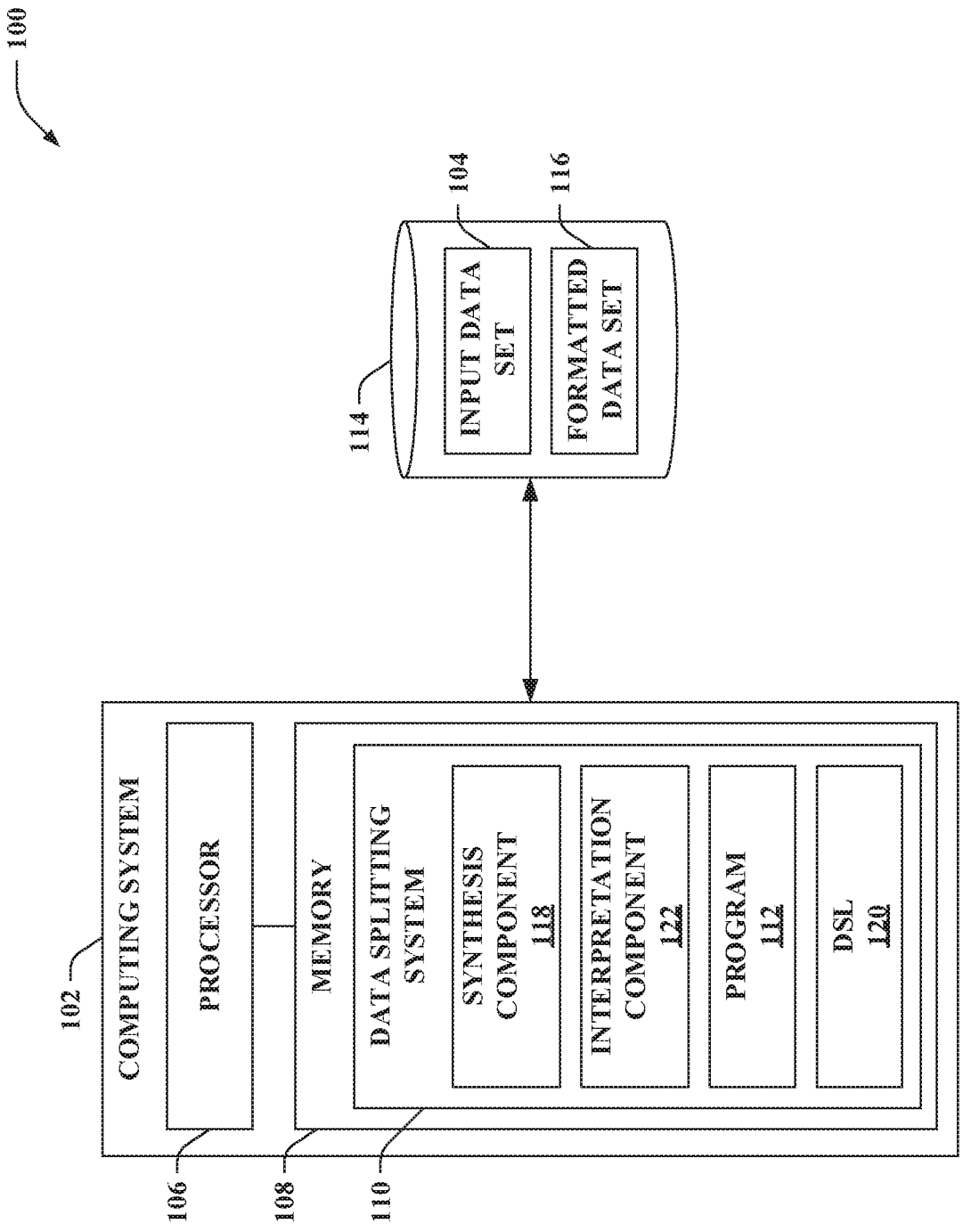
FIG. 1 illustrates a functional block diagram of an exemplary system that performs automated data splitting using predictive program synthesis.

Various technologies pertaining to synthesizing and executing a program for automatically splitting an input column of an input data set into multiple output columns are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that performs automated data splitting using predictive program synthesis. The system 100 includes a computing system 102 that is configured to perform data splitting on an input data set 104. The computing system 102 includes at least one processor 106 and memory 108. The processor 106 is configured to execute instructions loaded into the memory 108 (e.g., one or more systems loaded into the memory 108, one or more components loaded into the memory 108). As described in greater detail herein, the memory 108 includes a data splitting system 110 executable by the processor 106. The data splitting system 110 is configured to control synthesis and execution of a program 112 (or programs) for splitting an input column of the input data set 104 into multiple output columns.

The system 100 can include a data repository 114 that is accessible to the computing system 102. While shown as being separate from the computing system 102, it is to be understood that the data repository 114 may be included in the computing system 102. The data repository 114 stores the input data set 104. For instance, data included in the input data set 104 can be received from a plurality of different data sources. These data sources may include any suitable data sources, such as computer-executable applications, webpages, log files, sensors, etc. Moreover, the data outputted by the data sources can have different formats; accordingly, the input data set 104 can include data having various formats.

Pursuant to various examples, the computing system 102 can be a computing device. Substantially any type of computing device is intended to fall within the scope of the hereto appended claims. Examples of such computing device include a desktop computing device, a mobile computing device (e.g., a mobile telephone such as a smart phone, a laptop computing device, a tablet computing device, a wearable computing device a handheld computing device, a portable gaming device, a personal digital assistant), an automotive computer, a gaming console, a set top box, a television, an embedded computing device, or the like.

According to other examples, the computing system 102 can be or include one or more server computing devices. For instance, the computing system 102 can be or include one or more data centers, where a data center includes a plurality of server computing devices. One or more data centers can alternatively include the computing system 102. Further, the computing system 102 can be a distributed computing system.

The data splitting system 110 can split an input column of the input data set 104 into multiple output columns. Accordingly, the data splitting system 110 can output a formatted data set 116, which can be stored in the data repository 114. While the data repository 114 is depicted as including both the input data set 104 and the formatted data set 116, it is to be appreciated that the formatted data set 116 can replace the input data set 104 (or a portion of the formatted data set 116 can replace a portion of the input data set 104) responsive to the data splitting system 110 performing the splitting of the input column. According to another example, the input data set 104 and the formatted data set 116 can represent a common data set at different times, with the input data set 104 representing the common data set prior to splitting and the formatted data set 116 representing the common data set subsequent to splitting.

The data splitting system 110 can automatically split the input column of entries from the input data set 104 into multiple output columns in the formatted data set 116. As described herein, each entry in the input column of the input data set 104 can be a text string. A collection of entries (e.g., text strings) can be analyzed by the data splitting system 110 to identify an underlying pattern amongst those entries. The pattern can identify what is similar and what is variable amongst those entries. Accordingly, the data splitting system 110 can generate a program 112, which can transform an entry into an n-tuple of strings for a fixed n based on the discovered pattern (where n is a positive integer).

The data splitting system 110 includes a synthesis component 118 configured to receive input-only examples for splitting an input column of the input data set 104. The input-only examples include example entries from the input column of the input data set 104 to be split into multiple output columns without specification of how the example entries are to be split into multiple output columns. The synthesis component 118 is further configured to synthesize the program 112 for splitting the input column of the input data set 104 into the multiple output columns based on the input-only examples. The synthesis component 118 can synthesize the program 112 in a domain-specific language (DSL) 120 for splitting an entry (e.g., a text string) into a tuple of fields based on a combination of delimiters. The program 112 can be structured as a combination of independent field-level programs (also referred to herein as sub-programs) in the DSL 120 for different fields in the input data set 104. Further, the synthesis component 118 can synthesize the program 112 utilizing a predictive program synthesis algorithm.

The DSL 120 is designed to balance a trade-off between expressivity and tractability. Thus, the DSL 120 can be expressive enough to address a range of practical use cases (e.g., the DSL 120 can be used to synthesize programs for input data sets having a wide variety of custom formats). The DSL 120 can also be restrictive enough to facilitate efficiently generating correct programs (e.g., the DSL 120 can support efficient searching and ranking among possible sub-programs).

The data splitting system 110 can further include an interpretation component 122 configured to execute the program 112 on the input data set 104 to split the input column of the input data set 104 into the multiple output columns. Accordingly, subsequent to the program 112 being synthesized by the synthesis component 118 based on the input-only examples, the program 112 can be executed by the interpretation component 122 on a larger set of data (e.g., the input data set 104). Further, the interpretation component 122 can generate the formatted data set 116. The input column of the input data set 104 can be split into the multiple output columns such that, responsive to execution of the program 112 by the interpretation component 122 on the input data set 104, each entry from the input column of the input data set 104 can be separated into a tuple of fields. Moreover, the fields can be assigned to the multiple output columns. Since splitting is performed, each field of an entry is assigned to a corresponding output column (as opposed to extraction which need not include all portions of an input entry in an output).

The program 112 can split an entry (e.g., text string) from the input column of the input data set 104 into a tuple of fields (e.g., tuple of substrings) based on a combination of delimiters. Various types of delimiters are intended to fall within the scope of the hereto appended claims. For example, a delimiter in the text string can be an occurrence of a constant string in the text string (e.g., an exact match to the constant string or a match to the constant string that includes surrounding whitespace). According to another example, a delimiter in the text string can be a contextual delimiter. A contextual delimiter can be an occurrence of a constant string between a first regular expression match and a second regular expression match in the text string; thus, it is contemplated that a differing occurrence of the constant string that is not between the first regular expression match and the second regular expression match in the text string is not specified as a delimiter. Moreover, in some instances, either the first regular expression or the second regular expression can be empty. Pursuant to a further example, a delimiter in the text string can be a zero length delimiter. A zero length delimiter can be an empty string that specifies a boundary between two adjacent fields in the text string. A zero length delimiter is a special case of a contextual delimiter where the constant string is the empty string. A zero length delimiter can also include two regular expressions that match, or constrain, a prefix and a suffix of the two adjacent fields.

Automatic synthesis of the program 112 can be beneficial both to speed up the data cleaning or data wrangling process and to make such process accessible to a wide range of data analysts and knowledge workers regardless of programming skills. Moreover, the program 112 synthesized by the synthesis component 118 can be stored and subsequently applied to data set(s) similar to the input data set 104. It is also contemplated that the program 112 can be editable.

Now turning to FIG. 2, illustrated is an exemplary text splitting scenario. In the example shown in FIG. 2, an input data set 202 (e.g., the input data set 104) includes entries from a web server log. The input data set 202 is depicted as including one input column, with a plurality of rows in the input column. While one column and ten rows are shown in the input data set 202 of FIG. 2, it is contemplated that substantially any number of columns and rows can be included in the input data set 202. Moreover, each row (e.g., each entry) in the input column of the input data set 202 can include a text string having values such as IP address, date, etc., which are separated by various delimiting regions that are particular to a format of this log.

The data splitting system 110 described herein can split the values in the text strings into separate columns; thus, the data splitting system 110 can output a formatted data set 204 (e.g., the formatted data set 116) as illustrated in FIG. 2, where multiple columns can be formed from the input column of the input data set 202. In the example shown in FIG. 2, the input column of the input data set 202 can be split into columns 206-246 in the formatted data set 204. The columns 206, 210, 214, 218, 222, 226, 230, 234, 238, 242, and 246 include differing fields from the text strings of the input data set 202 (e.g., the column 206 includes IP addresses, the column 210 includes dates, the column 214 includes times). Moreover, the columns 208, 212, 216, 220, 224, 228, 232, 236, 240, and 244 include delimiters.

For a data set having a simple text-based format, such as a comma-separated values (CSV) format, a fixed, single character delimiter is typically used to separate data values in a string. For instance, the ";" character may be used to separate each value in such a data set. Accordingly, a traditional file parser may be used to split the data set at instances of the ";" character. Yet, a traditional file parser would be unable to perform the splitting described herein. More particularly, as shown in FIG. 2, there can be any number of arbitrary string delimiters used in the input data set 202, and a particular string may be used as a delimiter in some places but not in other locations in the input data set 202. For example, in FIG. 2, the "/" character is a delimiter separating the HTTP protocol version (in column 232), but the "/" character does not act as a delimiter inside the URLs in column 246. Hence, it is not possible to simply split the input data set 202 by all occurrences of a particular string.

Figure 3:
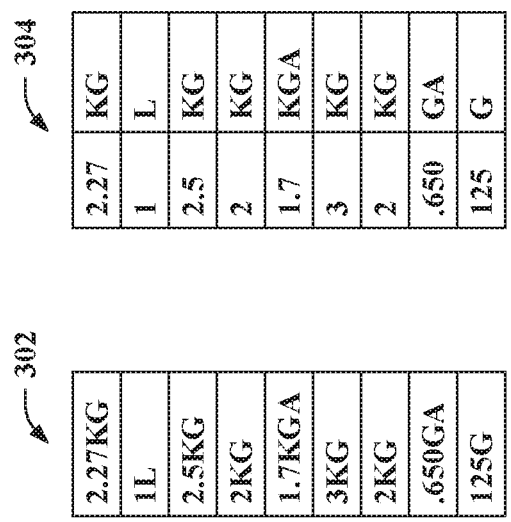
FIG. 3 illustrates another exemplary text splitting scenario, where strings to be split include a zero length delimiter.

Now turning to FIG. 3, illustrated is another exemplary text splitting scenario, where strings to be split include a zero length delimiter. An input column 302 and output columns 304 are depicted in FIG. 3. In various cases, there may actually be no delimiting string between two data values in a string to be split. For example, FIG. 3 shows a splitting task that can be performed by the data splitting system 110, where there are no delimiting characters. As depicted in the input column 302 of the input data set, numerical values and units of measure are adjacent to each other without a space there between; accordingly, there are no delimiting characters in the input column 302 between the numerical values and the units of measure. In this case, the data splitting system 110 can identify a zero length delimiting region, which can be a single point in a string defined by a context of having a number on the left side of the point and a letter on the right side of the point. Accordingly, the output columns 304 of the formatted data set can be outputted by execution of a program that splits the numerical values from the letters representing the units of measure.

Reference is now again made to FIG. 1. Various conventional approaches employ programming-by-example (PBE) techniques to extract data from an input data set. However, such conventional PBE techniques typically involve a user specifying their intention through explicit examples of a desired extraction. In contrast, the synthesis component 118 can employ predictive program synthesis, which can automatically learn the program 112 from input-only examples. The predictive approach set forth herein provides various advantages over previous PBE-based techniques.

For example, conventional PBE techniques can involve significant user effort to supply input-output examples. For instance, in the scenario shown in FIG. 2, the input column of the input data set 202 is split into more than 10 fields. It is contemplated that the input data set 104 can have on the order of 50 fields to split. Traditional PBE techniques commonly use two or three input-output examples per field, which can, therefore, lead to significant manual effort on the part of a user to provide the input-output examples for performing an extraction task. In contrast, the synthesis component 118 can synthesize the program 112 without the user providing the input-output examples for the various fields.

A user's lack of understanding of system requirements may also detrimentally impact conventional PBE techniques. In such PBE approaches, users may be unaware of examples that would be most useful to a learning system, given variability in the data. By way of illustration, input-output examples may be given on a top few rows of an input data set from which the system can learn a program. Following this illustration, the program that is learned based on the input-output examples from the top few rows may be over-specific to the given examples and, therefore, can fail for later rows in the input data set.

Moreover, the predictive program synthesis performed by the synthesis component 118 can employ more examples for learning the program 112 as compared with conventional PBE approaches. For instance, PBE approaches often times use a limited number of input-output examples to reduce the manual effort for the users. In contrast, the predictive approaches set forth herein can utilize substantially more input-only examples available in the input data set 104 to infer common patterns as well as variability present in the data (e.g., on the order of a few hundred or a thousand input-only examples can be used to synthesize the program 112).

Further, the predictive program synthesis employed by the synthesis component 118 can enable batch processing. In contrast, the need for manual intervention from the user in conventional PBE approaches can prevent the possibility of large-scale automation of data processing tasks. For example, if a large collection of input data sets in different formats or pages from different websites is to be processed using conventional PBE techniques, then the user typically would manually provide examples for each format that is encountered. In contrast, the techniques set forth herein can enable differing programs to be synthesized by the synthesis component 118 for the differing input data sets without the user manually supplying the input-output examples for each format.

The DSL 120 is now described in greater detail. The DSL 120 can be defined as a context-free grammar of the form of $(\tilde{\psi}_N, \tilde{\psi}_T, \tilde{\psi}_{start}, \mathcal{R})$ where $\tilde{\psi}_N$ is a set of non-terminal symbols, $\tilde{\psi}_T$ is the set of terminal symbols, $\tilde{\psi}_{start}$ is a start symbol, and $\mathcal{R}$ is a set of non-terminal production rules of the grammar. A terminal symbol is a literal symbol that may appear in the outputs of a production rule of the grammar and which cannot be changed using the rules of the grammar, and a non-terminal symbol is a symbol that can be replaced. Further, the non-terminal production rules can specify which symbols may replace other symbols.

Every symbol can be semantically interpreted as ranging over a set of values $[\![ \psi ]\!]$, which can be standard types, such as integers, strings, arrays, etc. Each production rule $r \in \mathcal{R}$ can represent an operator in the programming language, and can be of the form $\psi_h := \psi_p(\psi_1, \ldots, \psi_n)$, where $O_p$ is the name of the operator. An operator can take parameter types given by body symbols $\psi_i \in \tilde{\psi}_N \cup \tilde{\psi}_T$ and can return a value of a type given by a head symbol $\psi_h \in \tilde{\psi}_N$. Thus, the formal semantics of the DSL 120 can be given by an interpretation of each rule r as a function:

$$[\![ r ]\!] : [\![ \psi_1 ]\!] \times \ldots \times [\![ \psi_n ]\!] \to [\![ \psi_h ]\!]$$

In the foregoing, $\psi_h$ is the head symbol and $\psi_1, \ldots, \psi_n$ are the body symbols of the rule operator. A program P of type $\psi$ can be any concrete syntax tree defined by the DSL grammar with root symbol $\psi$. A complete program has the root symbol $\psi_{start}$. A derivation from a non-root symbol can be a sub-program.

Structural constraints that support the data splitting task can be imposed on the DSL 120. A first structural constraint is that a global variable available to the semantics of operators can exist in the programming language. The global variable can hold the input data set 104 on which the splitting task is being performed. The input variable can have a fixed type, such as a text string. Another structural constraint is that there can be a unique top-level rule in the DSL 120 that has the start symbol as the head symbol. The top-level rule can be of the form $\psi_{start} := O_{p_t}(\psi_f \ldots \psi_f)$ for some $O_{p_t}$ and $\psi_f$. The top-level rule models a splitting task as a program that includes a top-level operator $O_{p_t}$, where the top-level operator combines the results of different field-level programs $\psi_f$ that work at the level of individual fields in the input data. For example, for text splitting, the field-level programs can identify the logic for detecting particular delimiters between data values, while the top-level operator can combine these different delimiters to produce the list of extracted values.

An example of the DSL 120 (also referred to herein as DSL $\mathcal{L}_t$) for text splitting is shown below.

```
@startstring[ ]spl := SplitByDelimiters(d, . . . , d)
    Pair⟨int, int⟩ [ ]d := c|LookAround(r, c, r)
    Pair⟨int, int⟩ [ ]c := StrMatch(s)|StrMatchWs(s)
    Pair⟨int, int⟩ [ ]r := Empty( )|TokMatch(t)|Concat(r, r)
@inputstring         string s          RegexToken t
```

The DSL 120 can be based on delimiters and regular expressions for detecting splitting patterns. The symbols of the grammar are shown with their associated semantic types, and the start and terminal symbols can be explicitly marked. The input is a text string that includes values, possibly separated by delimiting regions, and the output (e.g., start symbol) of a program is an array of the extracted substrings. The top-level operator for the DSL 120 is the SplitByDelimiters function, which uses a number of different delimiter programs (e.g., field-level programs) to produce a final splitting of the input string. Each delimiter program can compute a sequence of delimiting regions represented as a pair of start and end positions in the input string. A delimiter program can be a match of a constant string (e.g., exact matches with StrMatch or matches including surrounding whitespace with StrMatchWs) or a contextual delimiter LookAround($r_1$, c, $r_2$) that matches occurrences of a constant string when it occurs between a first regular expression match $r_1$ and a second regular expression match $r_2$. For example, a program that splits by occurrences of ";" and occurrences of "," including the surrounding whitespace can be given as SplitByDelimiters(StrMatch(";"), StrMatchWs (",")). Following this example, on the input string "a; b, c; d, e; f", this exemplary program can produce the output ["a", ";", "b", ",", "c", ";", "d", ",", "e", ";", "f"]. Moreover, as described above in connection with FIG. 3, a contextual delimiter with an empty string can address zero length delimiter scenarios, where a desired splitting task can be accomplished with the following delimiter program that detects the boundaries between numbers and letters: LookAround(TokMatch([0-9]), " ", TokMatch([A-Za-z])).

Figure 4:
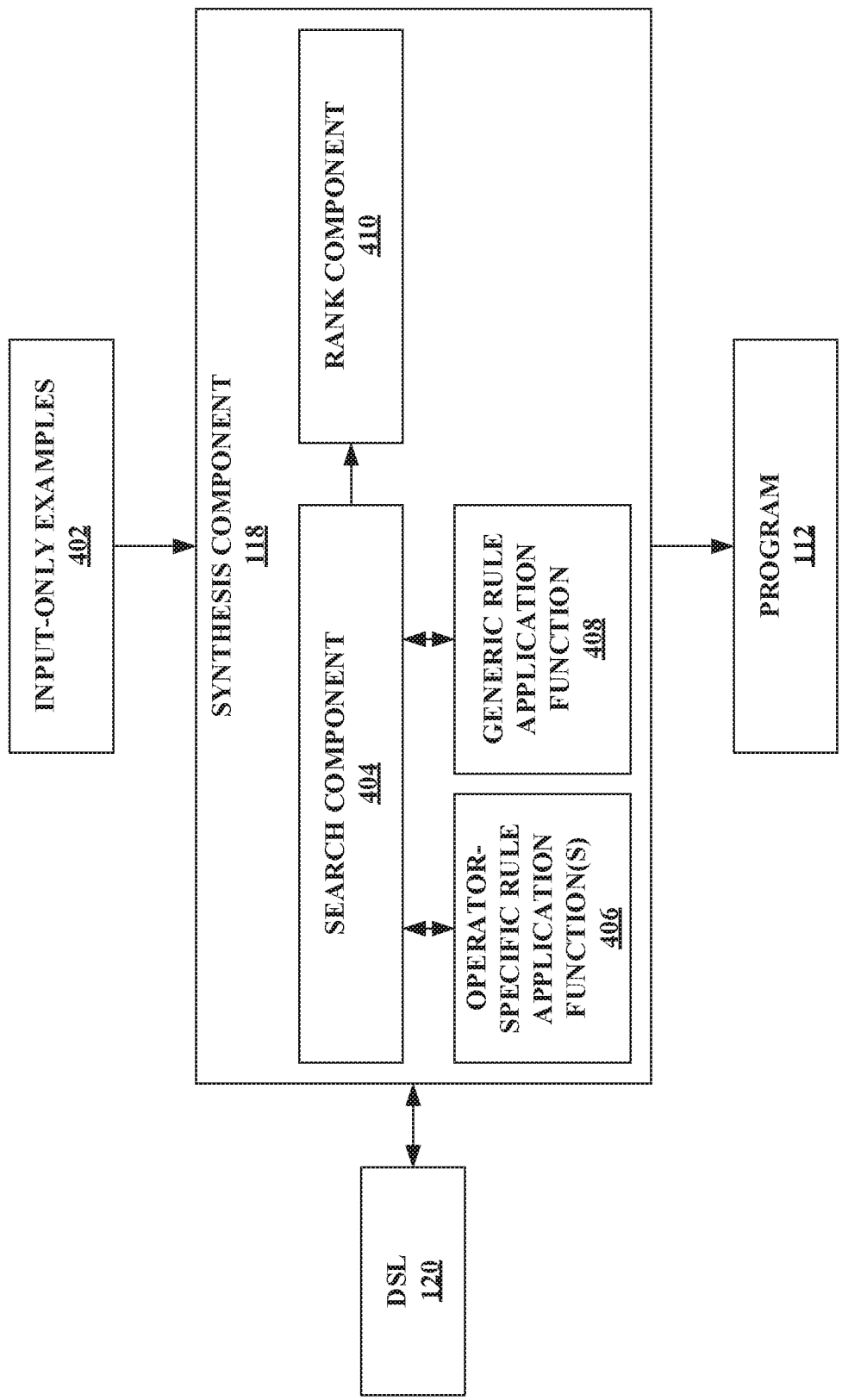
FIG. 4 illustrates a functional block diagram of an exemplary synthesis component of a data splitting system from FIG. 1 in greater detail.

Now turning to FIG. 4, illustrated is the synthesis component 118 of the data splitting system 110 in greater detail. As described herein, the synthesis component 118 is configured to synthesize the program 112 for splitting an input column of an input data set (e.g., the input data set 104) into multiple output columns based on input-only examples 402. The synthesis component 118 can employ the predictive program synthesis algorithm to generate the program 112 from the input-only examples 402.

The synthesis component 118 can include a search component 404 configured to synthesize field-level programs based on the input-only examples 402. The search component 404 can synthesize the field-level programs based on the input-only examples 402 utilizing a bottom-up enumerative search to evaluate potential candidate sub-programs in the DSL 120. The bottom-up enumerative search performed by the search component 404 can selectively employ operator-specific rule application function(s) 406 over program sets. The bottom-up enumerative search performed by the search component 404 can further employ a generic rule application function 408.

The predictive program synthesis algorithm can be parametric in various domain-specific properties, which can be provided as configuration parameters for particular domain instantiations (e.g., the DSL 120 can be provided as a configuration parameter). Given the DSL 120 and the input-only examples 402, the search component 404 can perform a systematic search to compute the semantically distinct values that can be generated by field-level programs in the DSL 120 up to a certain size bound. Further, as noted above, the search component 404 can utilize certain operator-specific rule application function(s) 406. The operator-specific rule application function(s) 406 can provide orders of magnitude improvement in complexity (compared to use of the generic rule application function 408) and performance for certain operators in the DSL 120, thereby making the synthesis tractable for the DSL 120. Moreover, the operator-specific rule application function(s) 406 can reduce execution time for synthesizing the program 112, reduce a number of processor cycles to perform such synthesis, and the like.

The synthesis component 118 can further include a rank component 410 configured to rank the field-level programs to select a subset of the field-level programs used to construct the program 112 for splitting the input column of the input data set into multiple columns. The rank component 410 can rank the field-level programs based on an alignment relation between the field-level programs. For instance, a maximal collection of aligned field-level programs can be selected by the rank component 410 as the subset of the field-level programs from which the program 112 is constructed.

The rank component 410 can also employ various heuristics to choose between differing programs (e.g., different sets of field-level programs) that generate the same output. Examples of the heuristics include ranking the programs based on size or complexity (e.g., programs that are smaller or simpler are ranked higher), delimiters included in the programs (e.g., programs that include more commonly used delimiters can be ranked higher), and whether constant string delimiters or contextual delimiters are included in the programs (e.g., programs that involve all occurrences of a character string as a delimiter can be preferred).

After the semantic state space exploration performed by the search component 404, the rank component 410 can perform the ranking to obtain the collection of the field-level programs that can be used by the top-level DSL operator as the program 112. In contrast to conventional program synthesis approaches, the ranking of field-level programs implemented by the rank component 410 is not based solely on the properties of the individual field-level programs, but instead on correspondences that hold between different field-level programs. For instance, due to the absence of any output specification, the ranking criteria utilized by the rank component 410 can be to prefer programs that identify maximal structure in the input data. Accordingly, the rank component 410 can identify a largest collection of field-level extractions that align well with one another for some notion of alignment that is relevant to the data domain.

Below is exemplary pseudocode for a predictive program synthesis algorithm that can be implemented by the synthesis component 118. It is to be appreciated, however, that this exemplary pseudocode is presented for illustration purposes, and the claimed subject matter is not limited to the following exemplary pseudocode.

```
1:   function PredictiveSynthesis(Ĩ, C)
2:       let Ĩ = (I_1, . . . , I_m)
3:       let C. DSL = (ψ_N, ψ_T, ψ_start, R )
4:       let r_t ∈ R  be the top rule ψ_start := O_{P_t}(ψ_f, . . . , ψ_f)
5:       let M: ψ_N ∪ ψ_T → P(Σ) map symbols to sets of states
6:       for each ψ ∈ ψ_T do
7:           M[ψ] ← {((v)^m, v|v ∈ C. ExtractLiterals(Ĩ, ψ_T)}
8:       for (iter = 0; iter < C. MaxDepth; iter + +) do
9:           for each r ∈ R \{r_t} do
10:              let r be ψ_h := O_p(ψ_1, . . . , ψ_n)
11:              if C. LiftFuncs[r] ≠ null then
12:                  σ̃ ← C. LiftFuncs[r](M[ψ_1], . . . , M[ψ_n])
13:              else
14:                  σ̃ ← LiftGeneric(M, r, m)
15:              σ̃_new ← {(ṽ, P) ∈ σ̃ |¬∃P'.(ṽ, P') ∈ M[ψ_h]}
16:              M[ψ_h] ← M[ψ_h] ∪ σ̃_new
17:          ((ṽ, P_1), . . . , (ṽ_k, P_k)) ← C. Rank(M[ψ_t])
18:          return O_{P_t}(P_1, . . . , P_k)
```

In the foregoing algorithm, a parameter Ĩ holds the m input examples $I_1, \ldots, I_m$ (e.g., the input-only examples 402). For splitting text strings, each input example may be a string in a row of an input data set (e.g., the input data set 104). Further, a parameter C is a configuration parameter that defines various configuration properties for the algorithm. For example, the configuration parameter can define configuration properties such as the DSL 120, the rule application functions (e.g., the operator-specific rule application function(s) 406 and the generic rule application function 408) (LiftFuncs), a bound on a depth of a syntax tree of programs considered (MaxDepth), a function that computes literal values for terminal types from the input data (ExtractLiterals), and a function that selects the field-level programs used to construct the program 112 (Rank). However, the claimed subject matter is not limited to the foregoing example.

Programs are synthesized in the DSL 120. The top-level rule and the field-level programs symbol $\psi_f$ are determined at line 4. At line 5, a state map M from symbols to a set of states is initialized, which can be used to maintain values generated by different programs on the given input examples. A state $\sigma \in \Sigma$ of type $\psi$ is of the form $(\bar{v}, P)$, representing a tuple of values $\bar{v}=(v_1, \ldots, v_m)$, where each $v_i \in [\![\psi]\!]$ is the value generated on input example $I_i$ by program P of type $\psi$. Moreover, $\bar{\sigma}$ can denote a set of states, and all states of type $\psi$ can be denoted by $\Sigma(\psi)$. As described below, the algorithm can include three phases, namely, state space initialization, search, and ranking.

The state map is initialized with literal values for each of the terminal symbols of the DSL 120 at lines 6 and 7. The initialization of the state map can be performed using the ExtractLiterals function, which can compute literal values for each terminal type from the input examples. For example, constant string values for s can be determined as any sub strings of the input examples. Alternatively, according to another example, special character strings can be identified in the input examples, where the special character strings are character strings commonly used as delimiters. Moreover, regular expression tokens t that can be considered are standard regular expression patterns for numbers, lower or upper case letters, special characters, date/time, etc. At line 7, the states for each terminal symbol can be initialized with the extracted literal values (where $(v)^m$ represents a value tuple of m occurrences of the same value v, since a literal can have the same value on any input example).

Moreover, the search component 404, as described herein, can synthesize the field-level programs (e.g., utilizing the bottom-up search). At Line 8, the bottom-up exploration of the state space can begin. The search can be bounded by the MaxDepth configuration parameter, which can impose a bound on the depth of the syntax tree of the programs considered by the search component 404. Given the existing set of states at each iteration, for each rule r other than the top-level rule, a set $\bar{\sigma}_{new}$ representing new distinct values created by the application of the rule over existing values can be computed at line 15. This rule application can be a lifting of the rule operator semantics function $[\![r]\!]$ to sets of states, namely, a function with signature:

$$P(\Sigma(\psi_1)) \times \ldots \times P(\Sigma(\psi_n)) \to P(\Sigma(\psi_h))$$

The operator-specific rule application function(s) 406 and the generic rule application function 408 can be used by the search component 404 to apply the rules. Below is exemplary pseudocode for the generic rule application function 408 (also referred to herein as a generic lifting function and LiftGeneric). Yet, it is to be appreciated that the claimed subject matter is not limited to the following example.

```
1: function LiftGeneric(M, r, m)
2:    let r be ψ_h := O_p(ψ_1, ..., ψ_n) and let result = ∅
3:    for each ((v̄, P_1), ..., (v̄_n, P_n)) ∈ M[[ψ_1]] × ... × M[[ψ_n]] do
4:       for k = 1 ... m do
5:          v_k ← [[r]](v̄_1[k], ... v̄_n[k])
6:          result ← result ∪ {((v_1, ..., v_m), O_p(P_1, ... P_n))}
7:    return result
```

The generic rule application function 408 can be used by the search component 404 for applying an arbitrary rule. The generic rule application function 408 can compute the cross product over parameter sets and can apply rule semantics over combinations of value tuples. The generic rule application function 408 is rule agnostic; however, the naïve combinatorial approach of the generic rule application function 408 can be expensive in practice (e.g., in terms of a duration of execution time, processing resources utilized).

Moreover, complexity reduction can be gained by the search component 404 using the operator-specific rule application function(s) 406 for certain kinds of operators. For instance, the LiftFuncs configuration parameter can map certain rule(s) to corresponding operator-specific application function(s) 406. Thus, at line 12 of the predictive program synthesis algorithm, one of the operator-specific rule application function(s) 406 (e.g., one of the lifting functions) can be used if such function exists for a rule being applied; alternatively, at line 14, the generic rule application function 408 is used as a default for a rule being applied if there is not a corresponding operator-specific rule application function.

According to an example, the operator-specific rule application function(s) 406 can include an operator-specific rule application function for the Concat (concatenation) operator and an operator-specific rule application function for the LookAround operator in the DSL 120 for text splitting. For example, for the Concat operator, there can be an existing set of regexes (regular expressions) that match on the input strings; further, it can be desired to find concatenations of the regexes that also match on the input strings. While the naïve approach can be to check all pairs, the operator-specific rule application function for the Concat operator can traverse the set of regex matches and can build a map from end positions to the regexes matching on those end positions. A second linear traversal can then check for regexes that start at these end positions, so that pairs of regexes that actually have adjacent matches on the input strings are considered. A similar technique can be used in the case of the LookAround operator, where triples instead of pairs of matches can be considered.

Moreover, the rank component 410 can be configured to rank the field-level programs, using the Rank function at line 17 of the predictive program synthesis algorithm, to select the subset of the field-level programs used to construct the program 112. The program 112 can be constructed from the selected subset of the field-level programs with the top-level operator at line 18. The rank component 410 can rank the field-level programs based on inter-subprogram correspondence. In contrast to previous ranking approaches that examine properties of individual programs, the rank component 410 can detect maximal structure in the input data by finding a largest collection of field-level extractions that aligned well with one another. The rank component 410 can find such maximal collections of states.

For instance, the correspondence relation used by the rank component 410 can be based on regular disjoint alignment of delimiters across inputs. Formally, states $(\bar{v}_1, P_1)$ and $(\bar{v}_2, P_2)$ satisfy the relation if $\bar{v}_1=(d_1, \ldots, d_m)$, $\bar{v}_2=(d'_1, \ldots, d'_m)$ and Ordering($d_1$, $d'_1$)= . . . =Ordering($d_m$, $d'_m$). Each $d_i$ and $d'_i$ is an array of integer pairs Pair(int, int)[ ] determined by delimiter programs $P_1$ and $P_2$ on the ith input example, where each pair can represent a region in the input string that is an occurrence of the delimiter. The Ordering($d_1$, $d_2$)=l can be defined, where l=null if any delimiter regions in $d_1$ and $d_2$ overlap, and otherwise l∈$\{0,1\}^{|d_1|+|d_2|}$ is a list of binary numbers representing the left to right ordering of the delimiter regions from $d_1$ and $d_2$. For example, Ordering([(1,4)], [(3,7)])=null since the two delimiter regions overlap, while Ordering([(2,3), (7,9)], [(4,6), (13,15)])=(0,1,0,1) as the two delimiters occur disjointly in an alternating fashion.

Figure 5:
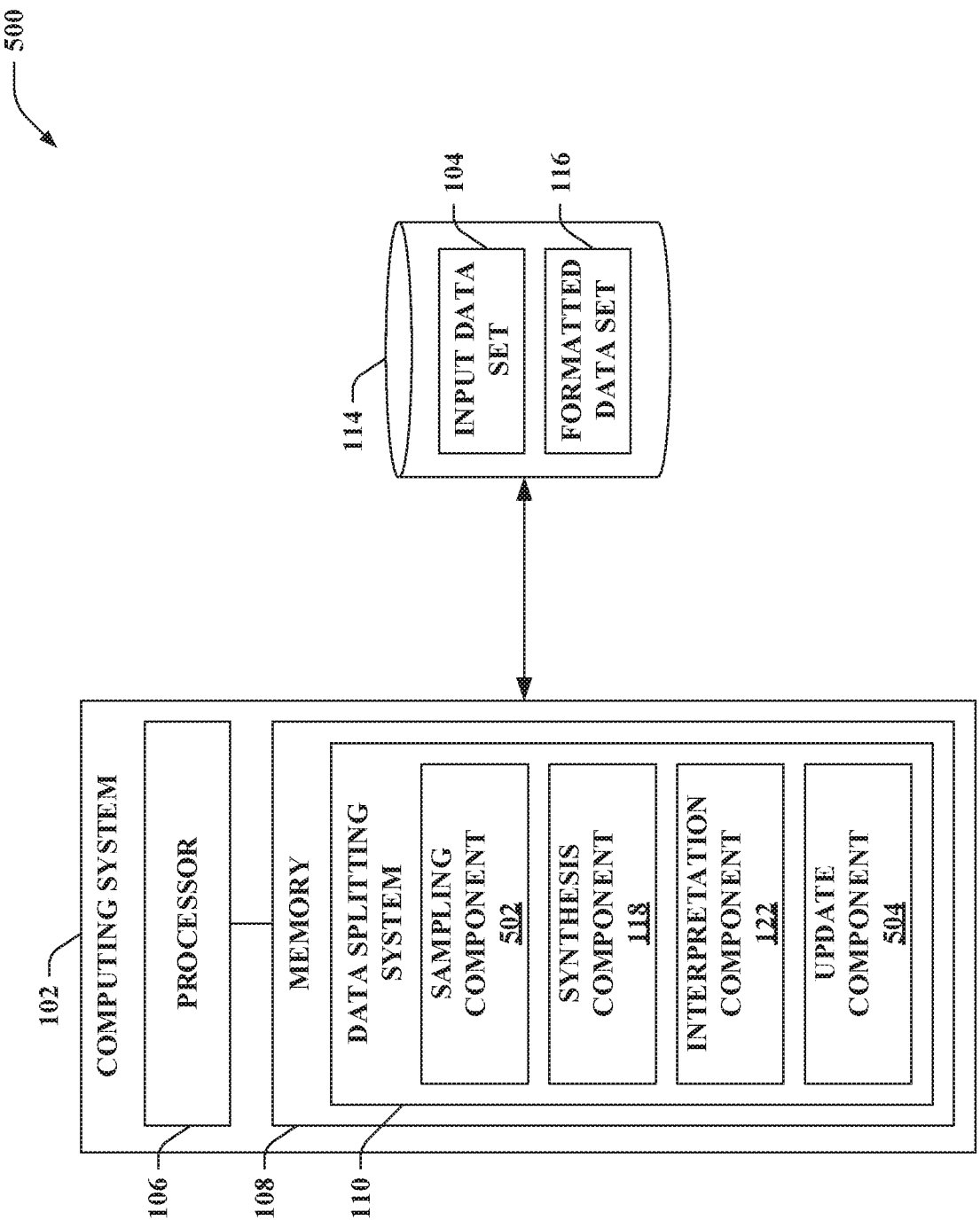
FIG. 5 illustrates a functional block diagram of another exemplary system that employs automated data splitting using predictive program synthesis.

Now turning to FIG. 5, illustrated is another system 500 that employs automated data splitting using predictive program synthesis. The system 500 again includes the computing system 102 and the data repository 114. The computing system 102 includes the data splitting system 110 loaded into the memory 108, which can be executable by the processor 106.

In the example set forth in FIG. 5, the data splitting system 110 can include a sampling component 502. The sampling component 502 can be configured to receive an indication that specifies the input column of the input data set 104. The indication can be received by the sampling component 502 responsive to user input selecting the input column of the input data set 104 or user input generally selecting the input data set 104, for example. According to another example, the indication can be automatically received without user input being provided (e.g., responsive to the input data set 104 reaching a predefined size, after a predetermined duration of time, responsive to the input data set 104 being accessed, responsive to initiating data cleaning or data wrangling of the input data set 104). The sampling component 502 can further sample entries from the input column of the input data set 104. Pursuant to an illustration, the sampling component 502 can uniformly sample the input data set 104; however, substantially any manner of sampling is intended to fall within the scope of the hereto appended claims. It is also contemplated that up to a fixed number of entries can be sampled from the input column of the input data set 104 by the sampling component 502 (e.g., up to 500 or 1,000 entries can be sampled by the sampling component 502); yet, the claimed subject matter is not so limited. The sampling component 502 can output the example entries of the input-only examples utilized by the data splitting system 110 for synthesizing the program for splitting the input column of the input data set 104.

Moreover, in the example shown in FIG. 5, the data splitting system 110 can include an update component 504. Upon the interpretation component 122 executing the program on the input data set 104 to split the input column of the input data set 104 into multiple columns, the update component 504 can receive negative feedback concerning the execution of the program on the input data set 104 for a particular entry from the input column of the input data set 104. The update component 504 can include a supplemental input-only example that includes the particular entry with the input-only examples previously utilized by the synthesis component 118 to synthesize the program to form updated input-only examples for splitting the input column of the input data set 104. Accordingly, the synthesis component 118 can synthesize an updated program for splitting the input column of the input data set 104 into the multiple output columns based on the updated input-only examples. Thus, the update component 504 can control iteratively updating the program based on the negative feedback (e.g., the particular entry not having an anticipated number of splits or the splits being not of the same data type responsive to execution of the program) without user input.

Figure 6:
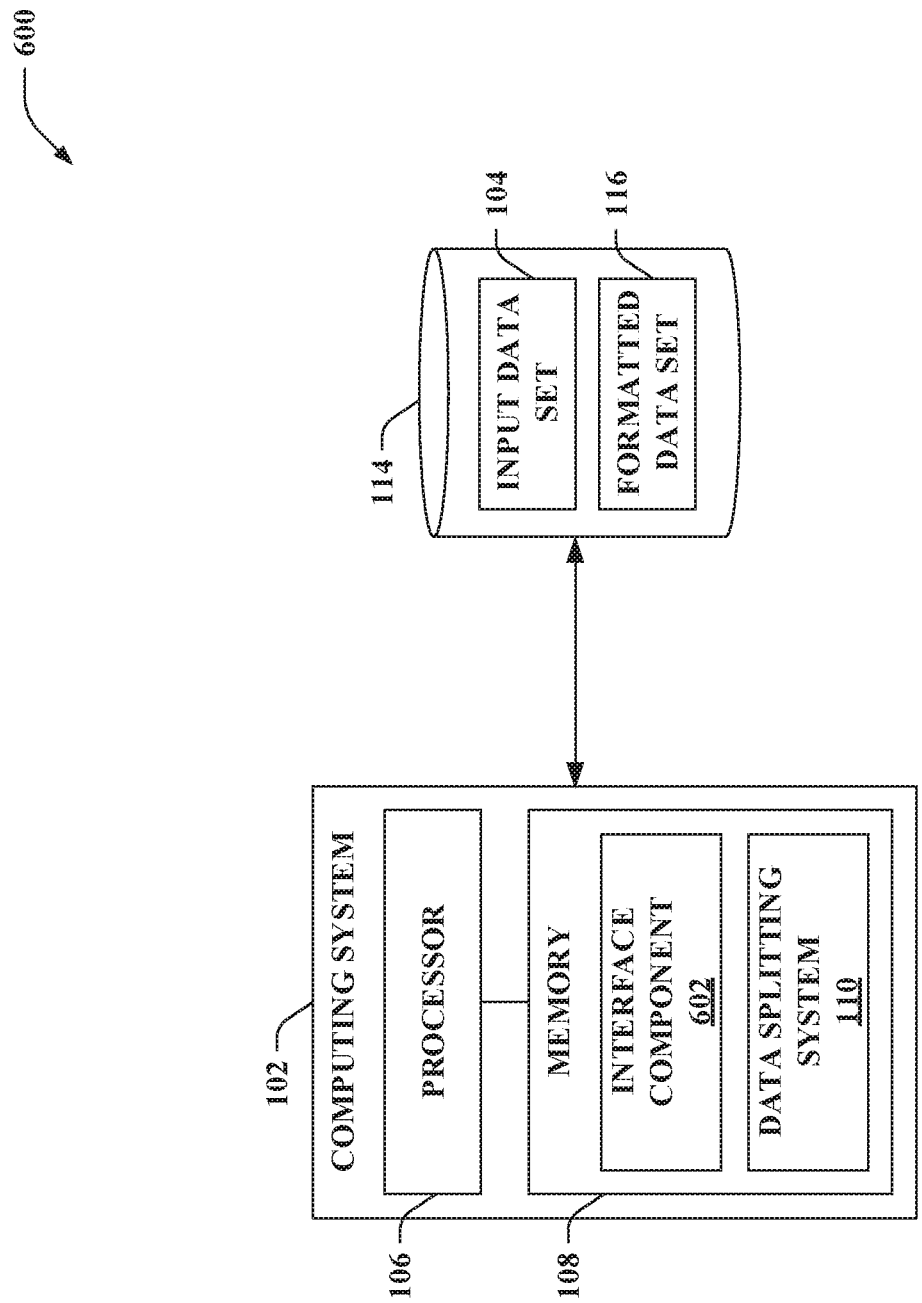
FIG. 6 illustrates a functional block diagram of an exemplary system that enables generating visualizations of data sets.

With reference to FIG. 6, illustrated is a system 600 that enables generating visualizations of data sets. The system 600 includes the computing system 102 and the data repository 114. Similar to above, the memory 108 of the computing system 102 can include the data splitting system 110. Moreover, the memory 108 of the computing system 102 can include an interface component 602 that can generate visualizations of data sets. According to an example, the interface component 602 can cause the input data set 104 (or a portion thereof) to be displayed on a display screen. Following this example, responsive to the data splitting system 110 splitting an input column of the input data set 104 into multiple columns, the interface component 602 can display the formatted data set 116 (or a portion thereof) on the display screen. It is further contemplated that user input (e.g., selecting the input column of the input data set 104 to be split) can be received via the interface component 602.

Alternatively, pursuant to another example, it is contemplated that a computing device separate from the computing system 102 can include the interface component 602 and the display screen. Following this example, the computing device and the computing system 102 can communicate by way of a network connection (e.g., the computing device can cause the data splitting system 110 to split the input column of the input data set 104). Additionally or alternatively, the computing device separate from the computing system 102 can access the data repository 114 via a network connection to enable the interface component 602 to generate visualizations of the data sets.

Figure 7:
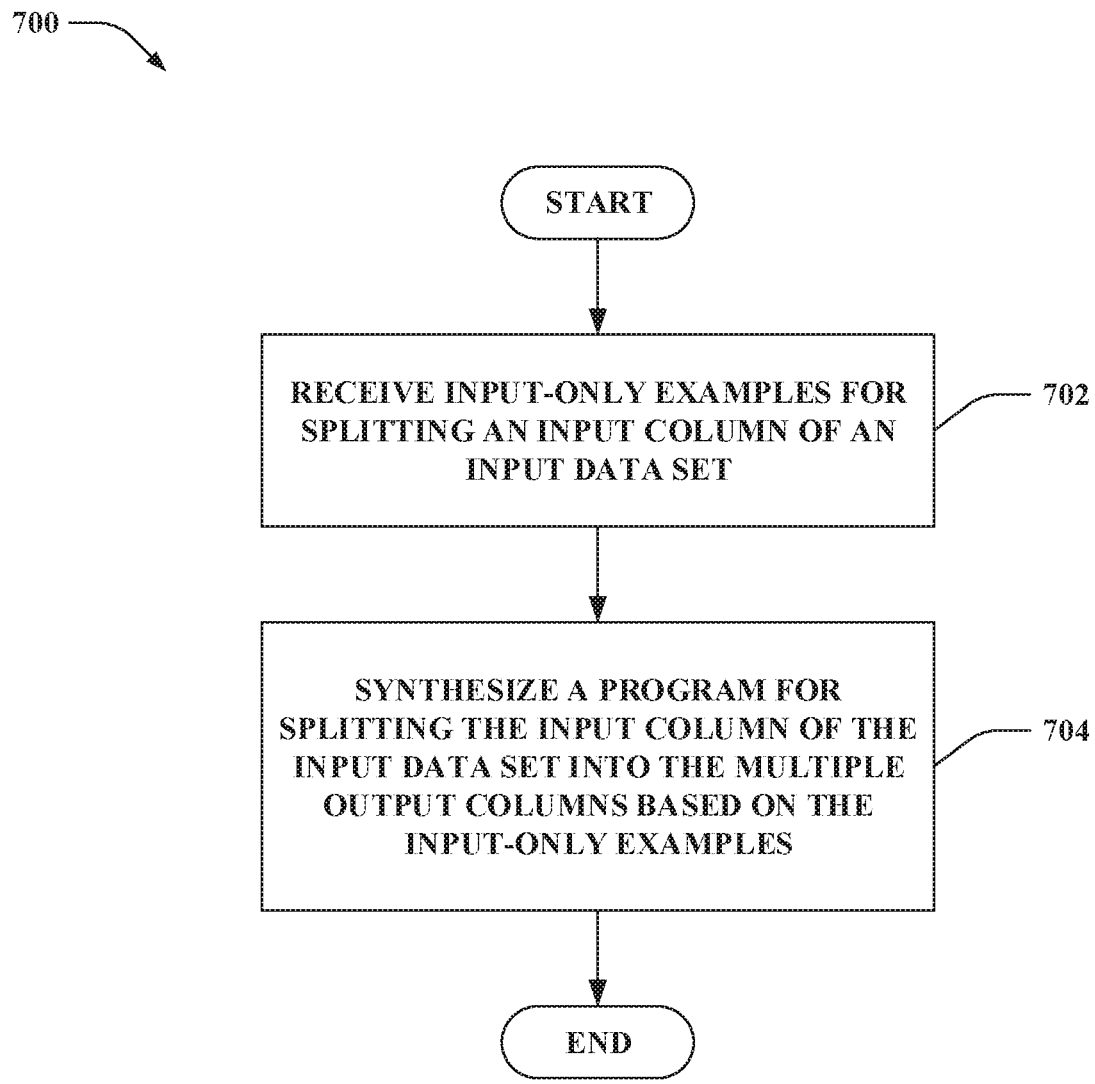
FIG. 7 is a flow diagram that illustrates an exemplary methodology for automatically splitting an input column of an input data set into multiple output columns.
Figure 8:
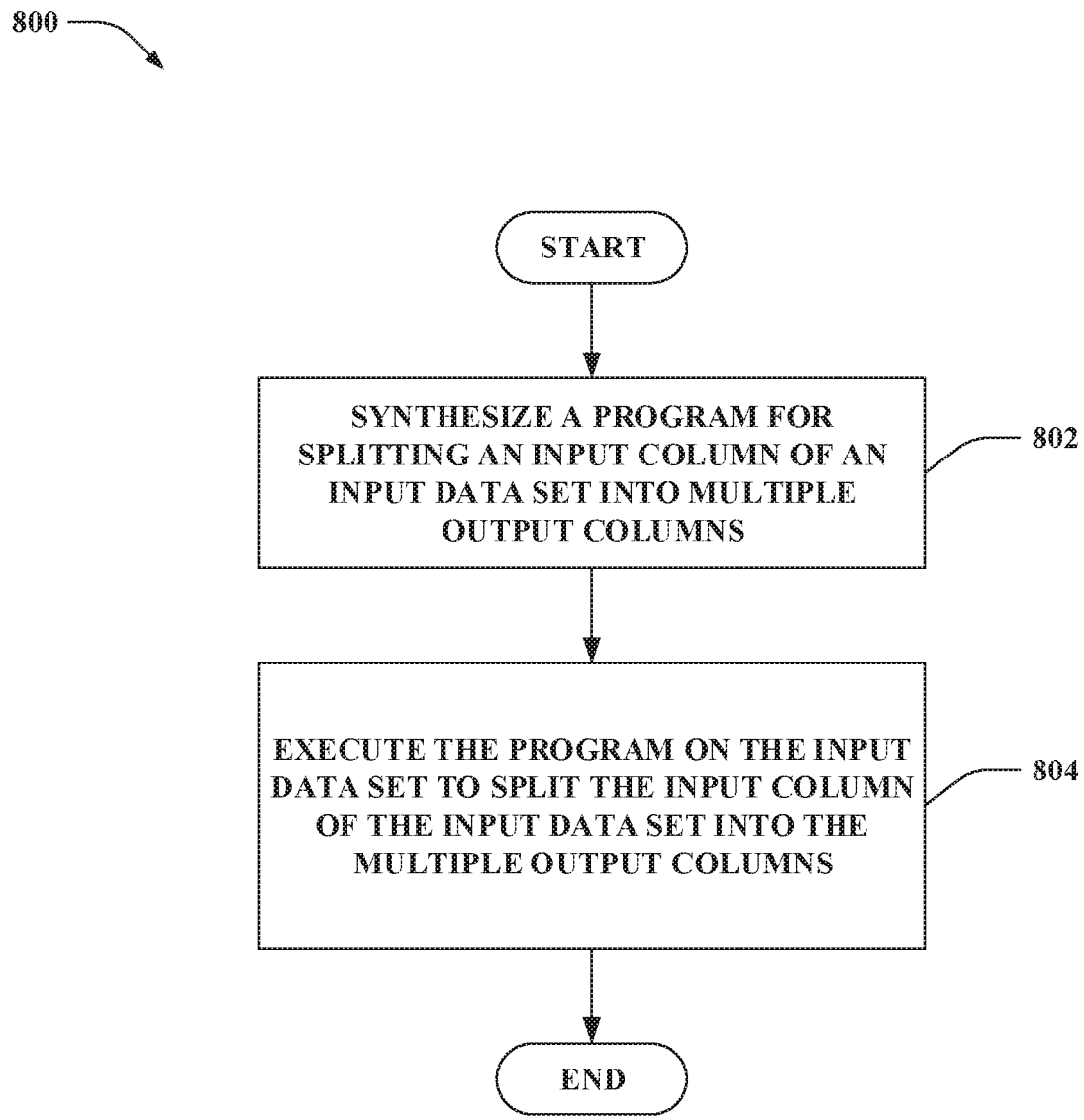
FIG. 8 is a flow diagram that illustrates another exemplary methodology for automatically splitting an input column of an input data set into multiple output columns.
Figure 9:
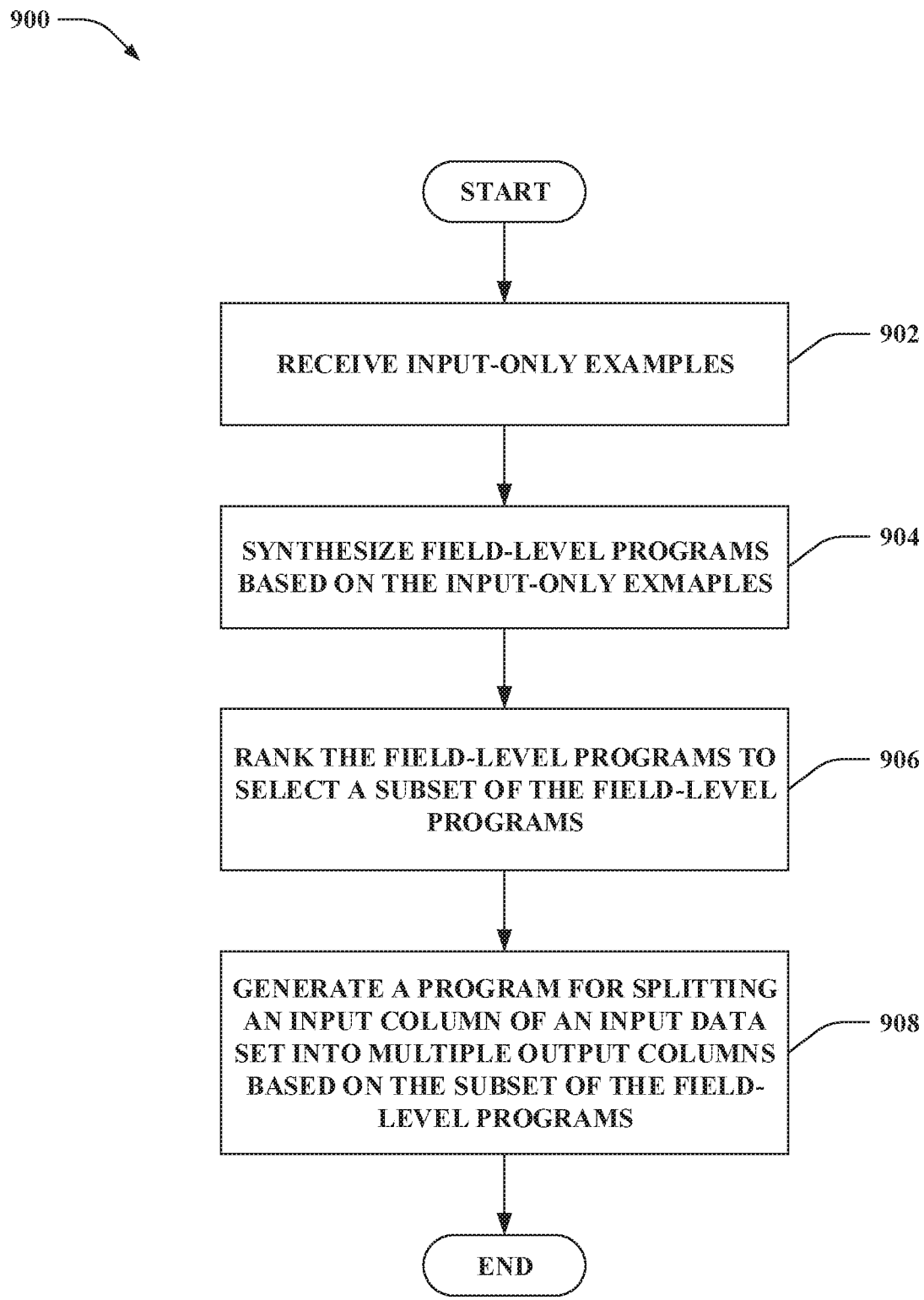
FIG. 9 is a flow diagram that illustrates an exemplary methodology for synthesizing a program for splitting an input column of an input data set into multiple output columns.

FIGS. 7-9 illustrate exemplary methodologies relating to synthesizing and/or executing a program for automatically splitting an input column of an input data set into multiple output columns. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 7 illustrates a methodology 700 for automatically splitting an input column of an input data set into multiple output columns. At 702, input-only examples for splitting the input column of the input data set can be received. The input-only examples include example entries from the input column of the input data set to be split into the multiple output columns without specification of how the example entries are to be split into the multiple output columns. At 704, a program for splitting the input column of the input data set into the multiple output columns can be synthesized based on the input-only examples. The program can be executed on the input data set to split the input column of the input data set into the multiple output columns.

Now referring to FIG. 8, illustrated is another methodology 800 for automatically splitting an input column of an input data set into multiple output columns. At 802, a program for splitting the input column of the input data set into the multiple output columns can be synthesized. The program can be synthesized in a domain-specific language (DSL) for splitting a text string into a tuple of fields based on a combination of delimiters. The delimiters can include a contextual delimiter, which is an occurrence of a constant string between a first regular expression match and a second regular expression match in the text string. At 804, the program can be executed on the input data set to split the input column of the input data set into the multiple output columns.

With reference to FIG. 9, illustrated is a methodology 900 for synthesizing a program for splitting an input column of an input data set into multiple output columns. At 902, input-only examples can be received. The input-only examples can include example entries from the input column of the input data set to be split into the multiple output columns without specification of how the example entries are to be split into the multiple output columns. At 904, field-level programs can be synthesized based on the input-only examples. At 906, the field-level programs can be ranked to select a subset of the field-level programs. At 908, the program for splitting the input column of the input data set into the multiple output columns can be generated based on the subset of the field-level programs.

Figure 10:
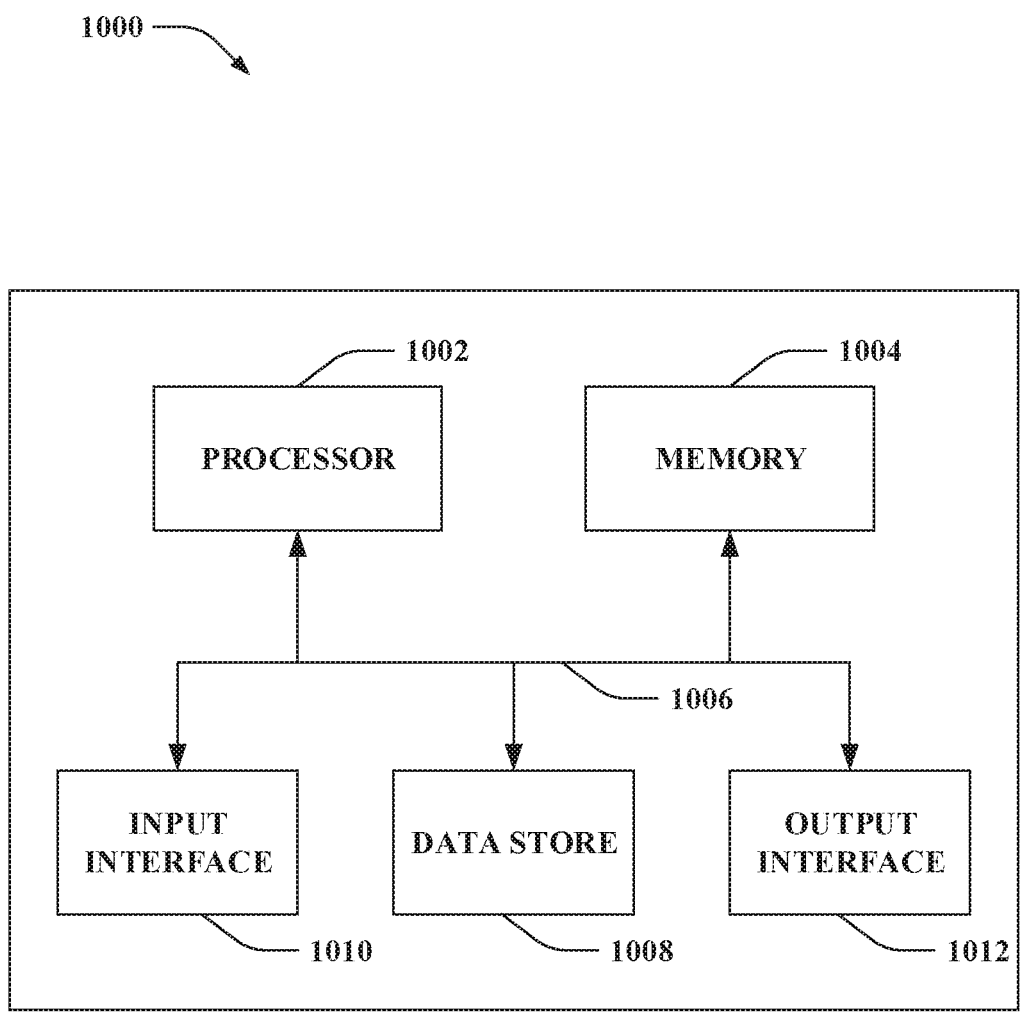
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be used in a system that performs automated data splitting using predictive program synthesis. By way of another example, the computing device 1000 can be used to cause an input column of an input data set to be split into multiple output columns and/or generate visualizations of data sets. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store programs, input-only examples, data set(s) (or portions thereof), and so forth.

The computing device 1000 additionally includes a data store 1008 that is accessible by the processor 1002 by way of the system bus 1006. The data store 1008 may include executable instructions, programs, input-only examples, data set(s) (or portions thereof), etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Figure 11:
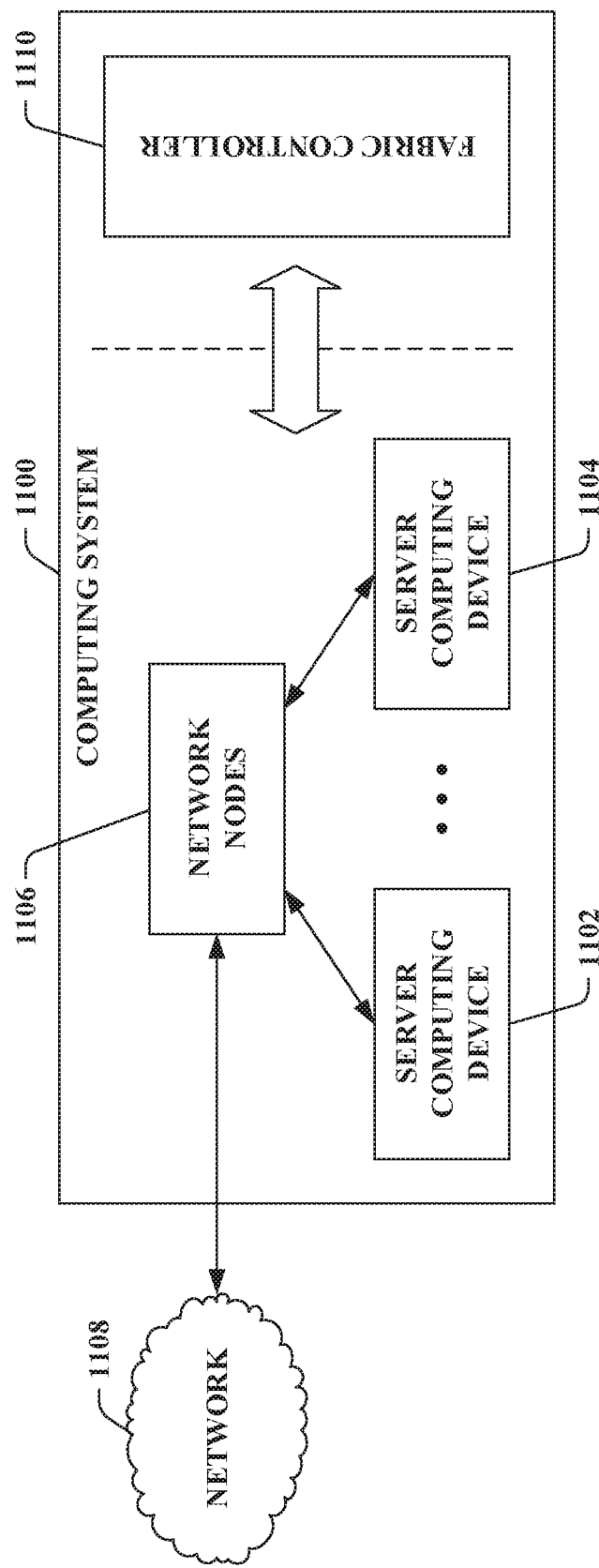
FIG. 11 illustrates an exemplary computing system.

Turning to FIG. 11, a high-level illustration of an exemplary computing system 1100 that can be used in accordance with the systems and methodologies disclosed herein is illustrated. For instance, the computing system 1100 can be or include the computing system 102. Additionally or alternatively, the computing system 102 can be or include the computing system 1100.

The computing system 1100 includes a plurality of server computing devices, namely, a server computing device 1102, . . . , and a server computing device 1104 (collectively referred to as server computing devices 1102-1104). The server computing device 1102 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 1102, at least a subset of the server computing devices 1102-1104 other than the server computing device 1102 each respectively include at least one processor and a memory. Moreover, at least a subset of the server computing devices 1102-1104 include respective data stores.

Processor(s) of one or more of the server computing devices 1102-1104 can be or include the processor 106. Further, a memory (or memories) of one or more of the server computing devices 1102-1104 can be or include the memory 108. Moreover, a data store (or data stores) of one or more of the server computing devices 1102-1104 can be or include the data repository 114; yet, the claimed subject matter is not so limited as it is to be appreciated that the data repository 114 can be separate from, but in communication with, the computing system 1100.

The computing system 1100 further includes various network nodes 1106 that transport data between the server computing devices 1102-1104. Moreover, the network nodes 1102 transport data from the server computing devices 1102-1104 to external nodes (e.g., external to the computing system 1100) by way of a network 1108. The network nodes 1102 also transport data to the server computing devices 1102-1104 from the external nodes by way of the network 1108. The network 1108, for example, can be the Internet, a cellular network, or the like. The network nodes 1106 include switches, routers, load balancers, and so forth.

A fabric controller 1110 of the computing system 1100 manages hardware resources of the server computing devices 1102-1104 (e.g., processors, memories, data stores, etc. of the server computing devices 1102-1104). The fabric controller 1110 further manages the network nodes 1106.

Moreover, the fabric controller 1110 manages creation, provisioning, de-provisioning, and supervising of virtual machines instantiated upon the server computing devices 1102-1104.

Various examples are now set forth.

Example 1

A computing system, comprising: at least one processor; and memory that comprises computer-executable instructions that, when executed by the at least one processor, cause the at least one processor to perform acts including: receiving input-only examples for splitting an input column of an input data set, the input-only examples comprise example entries from the input column of the input data set to be split into multiple output columns without specification of how the example entries are to be split into the multiple output columns; and synthesizing a program for splitting the input column of the input data set into the multiple output columns based on the input-only examples.

Example 2

The computing system according to Example 1, the memory further comprising computer-executable instructions that, when executed by the at least one processor, cause the at least one processor to perform acts including: executing the program on the input data set to split the input column of the input data set into the multiple output columns.

Example 3

The computing system according to Example 2, wherein the input column of the input data set is split into the multiple output columns such that, responsive to execution of the program on the input data set, each entry from the input column of the input data set is separated into a tuple of fields, and the fields are assigned to the multiple output columns.

Example 4

The computing system according to any of Examples 2-3, the memory further comprising computer-executable instructions that, when executed by the at least one processor, cause the at least one processor to perform acts including: receiving negative feedback concerning execution of the program on the input data set for a particular entry from the input column of the input data set; including a supplemental input-only example that comprises the particular entry with the input-only examples to form updated input-only examples for splitting the input column of the input data set, and synthesizing an updated program for splitting the input column of the input data set into the multiple output columns based on the updated input-only examples.

Example 5

The computing system according to any of Examples 1-4, wherein the program is synthesized in a domain-specific language (DSL) for splitting an entry into a tuple of fields based on a combination of delimiters, the entry being a text string.

Example 6

The computing system according to Example 5, wherein the delimiters comprise a contextual delimiter, the contextual delimiter being an occurrence of a constant string between a first regular expression match and a second regular expression match in the text string.

Example 7

The computing system according to Example 6, wherein a differing occurrence of the constant string that is not between the first regular expression match and the second regular expression match in the text string is not specified as a delimiter.

Example 8

The computing system according to any of Examples 5-7, wherein the delimiters comprise a zero length delimiter, the zero length delimiter being an empty string that specifies a boundary between two adjacent fields in the text string, along with two regular expressions that match a prefix and a suffix of the two adjacent fields.

Example 9

The computing system according to any of Examples 1-8, wherein synthesizing the program for splitting the input column of the input data set into the multiple output columns further comprises: synthesizing field-level programs based on the input-only examples; and ranking the field-level programs to select a subset of the field-level programs used to construct the program for splitting the input column of the input data set into the multiple output columns.

Example 10

The computing system according to Example 9, wherein synthesizing the field-level programs based on the input-only examples comprises utilizing a bottom-up enumerative search to evaluate potential candidate sub-programs in a domain specific language (DSL).

Example 11

The computing system according to Example 10, wherein the bottom-up enumerative search selectively employs operator-specific rule application functions over program sets.

Example 12

The computing system according to any of Examples 9-11, wherein the ranking of the field-level programs is based on an alignment relation between the field-level programs, and wherein a maximal collection of aligned field-level programs is selected as the subset of the field-level programs from which the program for splitting the input column of the input data set into the multiple output columns is constructed.

Example 13

The computing system according to any of Examples 1-12, wherein receiving the input-only examples for splitting the input column of the input data set further comprises: receiving an indication that specifies the input column of the input data set; and sampling entries from the input column of the input data set, wherein sampling the entries outputs the example entries of the input-only examples.

Example 14

A method for automatically splitting an input column of an input data set into multiple output columns, comprising: synthesizing a program for splitting the input column of the input data set into the multiple output columns, the program being synthesized in a domain-specific language (DSL) for splitting a text string into a tuple of fields based on a combination of delimiters, the delimiters comprise a contextual delimiter, the contextual delimiter being an occurrence of a constant string between a first regular expression match and a second regular expression match in the text string; and executing the program on the input data set to split the input column of the input data set into the multiple output columns.

Example 15

The method according to Example 14, wherein a differing occurrence of the constant string that is not between the first regular expression and the second regular expression in the text string is not specified as a delimiter.

Example 16

The method according to any of Examples 14-15, wherein the delimiters further comprise a zero length delimiter, the zero length delimiter is an empty string that specifies a boundary between two adjacent fields in the text string, along with two regular expressions that constrain a prefix and a suffix of the two adjacent fields.

Example 17

The method according to any of Examples 14-16, further comprising: sampling entries from the input column of the input data set to obtain example entries, wherein the program for splitting the input column of the input data set into the multiple output columns is synthesized based on the example entries without specification of how the example entries are to be split into the multiple output columns.

Example 18

A method for synthesizing a program for splitting an input column of an input data set into multiple output columns, comprising: receiving input-only examples, the input-only examples comprise example entries from the input column of the input data set to be split into the multiple output columns without specification of how the example entries are to be split into the multiple output columns; synthesizing field-level programs based on the input-only examples; ranking the field-level programs to select a subset of the field-level programs; and generating the program for splitting the input column of the input data set into multiple output columns based on the subset of the field-level programs.

Example 19

The method according to Example 18, wherein synthesizing the field-level programs further comprises: performing a bottom-up enumerative search in a domain-specific language (DSL), wherein the bottom-up enumerative search employs at least one operator-specific rule application function and a generic rule application function.

Example 20

The method according to any of Examples 18-19, wherein ranking the field-level programs to select the subset of the field-level programs further comprises: selecting, from the field-level programs, a maximal collection of aligned field-level programs as the subset of the field-level programs.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
  at least one processor; and
  memory that comprises computer-executable instructions that, when executed by the at least one processor, cause the at least one processor to:
    receive input-only examples for splitting an input column of an input data set, the input-only examples comprising example entries from the input column of the input data set to be split into multiple output columns without specification of how the example entries are to be split into the multiple output columns; and
    synthesize, based on the input-only examples, a program for splitting the input column of the input data set into the multiple output columns at detected delimiters, the program being synthesized to split the input column into a number of output columns identified based on an underlying pattern amongst entries from the input column where the underlying pattern is detected by analyzing the example entries, the detected delimiters in an entry from the input column comprising a zero length delimiter, the zero length delimiter comprising an empty string that specifies a boundary between two adjacent field in the entry from the input column.

2. The computing system of claim 1, the memory further comprising computer-executable instructions that, when executed by the at least one processor, cause the at least one processor to:
  execute the program on the input data set to split the input column of the input data set into the multiple output columns.

3. The computing system of claim 2, wherein the input column of the input data set is split into the multiple output columns such that, responsive to execution of the program on the input data set, each of the entries from the input column of the input data set is separated into a tuple of fields, and the fields are assigned to the multiple output columns.

4. The computing system of claim 2, the memory further comprising computer-executable instructions that, when executed by the at least one processor, cause the at least one processor to:
  receive feedback concerning execution of the program on the input data set for a particular entry from the input column of the input data set;
  include a supplemental input-only example that comprises the particular entry with the input-only examples to form updated input-only examples for splitting the input column of the input data set, and
  synthesize an updated program for splitting the input column of the input data set into the multiple output columns based on the updated input-only examples.

5. The computing system of claim 1, wherein the program is synthesized in a domain-specific language (DSL) for splitting an entry into a tuple of fields based on the detected delimiters, the entry being a text string.

6. The computing system of claim 5, wherein the detected delimiters comprise a contextual delimiter, the contextual delimiter being an occurrence of a constant string between a first regular expression match and a second regular expression match in the text string.

7. The computing system of claim 6, wherein a differing occurrence of the constant string that is not between the first regular expression match and the second regular expression match in the text string is not specified as a delimiter.

8. The computing system of claim 1, wherein the zero length delimiter further comprises two regular expressions that match a prefix and a suffix of the two adjacent fields.

9. The computing system of claim 1, wherein causing the at least one processor to synthesize the program for splitting the input column of the input data set into the multiple output columns at the detected delimiters further comprises causing the at least one processor to:
  synthesize field-level programs based on the input-only examples; and
  rank the field-level programs to select a subset of the field-level programs used to construct the program for splitting the input column of the input data set into the multiple output columns.

10. The computing system of claim 9, wherein causing the at least one processor to synthesize the field-level programs based on the input-only examples comprises causing the at least one processor to utilize a bottom-up enumerative search to evaluate potential candidate sub-programs in a domain specific language (DSL).

11. The computing system of claim 10, wherein the bottom-up enumerative search selectively employs operator-specific rule application functions over program sets.

12. The computing system of claim 9, wherein the field-level programs are ranked based on an alignment relation between the field-level programs, and wherein a maximal collection of aligned field-level programs is selected as the subset of the field-level programs from which the program for splitting the input column of the input data set into the multiple output columns is constructed.

13. The computing system of claim 1, wherein causing the at least one processor to receive the input-only examples for splitting the input column of the input data set further comprises causing the at least one processor to:
  receive an indication that specifies the input column of the input data set; and
  sample the entries from the input column of the input data set, wherein sampling the entries outputs the example entries of the input-only examples.

14. A method for automatically splitting an input column of an input data set into multiple output columns, comprising:
  synthesizing a program for splitting the input column of the input data set into the multiple output columns, the program being synthesized based on input-only examples that comprise example entries from the input column of the input data set to be split into the multiple output columns without specification of how the example entries are to be split into the multiple output columns, the program being synthesized to split the input column into a number of output columns identified based on an underlying pattern amongst entries from the input column where the underlying pattern is detected by analyzing the example entries, the program being synthesized in a domain-specific language (DSL) for splitting a text string into a tuple of fields based on a combination of delimiters, the delimiters comprise a zero length delimiter, the zero length delimiter comprises an empty string that specifies a boundary between two adjacent fields in the text string; and executing the program on the input data set to split the input column of the input data set into the multiple output columns.

15. The method of claim 14, wherein the delimiters further comprise a contextual delimiter, the contextual delimiter being an occurrence of a constant string between a first regular expression match and a second regular expression match in the text string, and a differing occurrence of the constant string that is not between the first regular expression and the second regular expression in the text string is not specified as a delimiter.

16. The method of claim 14, wherein the zero length delimiter further comprises two regular expressions that constrain a prefix and a suffix of the two adjacent fields.

17. A method for synthesizing a program for splitting an input column of an input data set into multiple output columns, comprising:

receiving input-only examples, the input-only examples comprise example entries from the input column of the input data set to be split into the multiple output columns without specification of how the example entries are to be split into the multiple output columns;

synthesizing field-level programs based on the input-only examples;

ranking the field-level programs to select a subset of the field-level programs; and generating the program for splitting the input column of the input data set into the multiple output columns at detected delimiters based on the subset of the field-level programs, the program splits the input column into a number of output columns identified based on an underlying pattern amongst entries from the input column where the underlying pattern is detected by analyzing the example entries, the detected delimiters in an entry from the input column comprise a zero length delimiter, the zero length delimiter comprises an empty string that specifies a boundary between two adjacent fields in the entry from the input column.

18. The method of claim 17, wherein synthesizing the field-level programs further comprises:

performing a bottom-up enumerative search in a domain-specific language (DSL), wherein the bottom-up enumerative search employs at least one operator-specific rule application function and a generic rule application function.

19. The method of claim 17, wherein ranking the field-level programs to select the subset of the field-level programs further comprises:

selecting, from the field-level programs, a maximal collection of aligned field-level programs as the subset of the field-level programs.

20. The method of claim 14, wherein the input column of the input data set is split into the multiple output columns such that, responsive to execution of the program on the input data set, each of the entries from the input column of the input data set is separated into the tuple of fields, and the fields are assigned to the multiple output columns.

* * * * *